(No Model.) 2 Sheets—Sheet 1.
J. KIESLER.
POWER SHOVEL.
No. 563,492. Patented July 7, 1896.
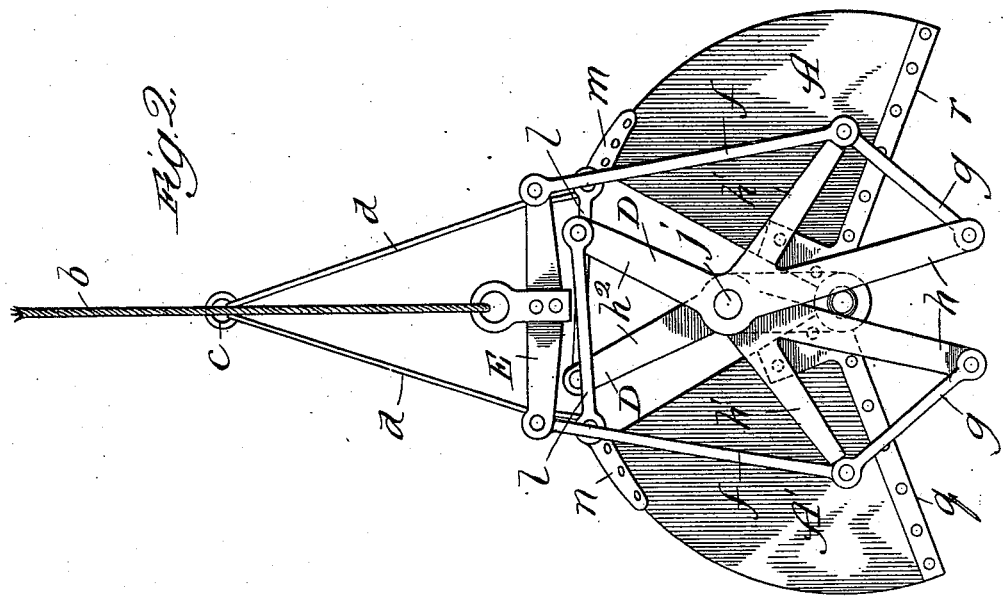
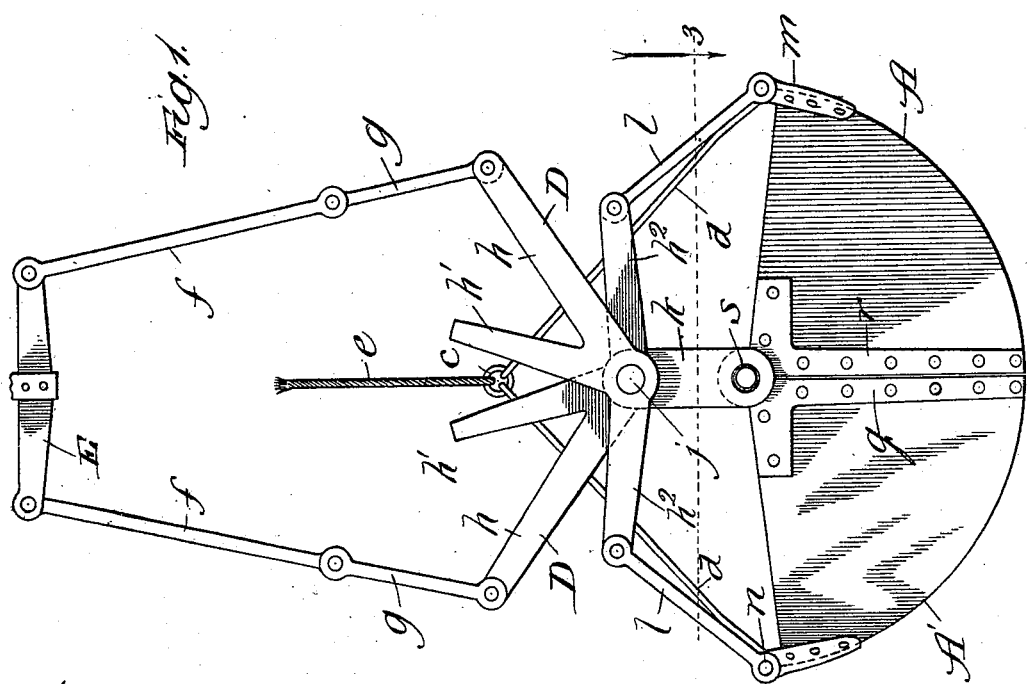
Witnesses:
Chas. E. Gaylord
Lute J. Filter
Inventor:
Joseph Kiesler,
By Dyrenforth & Dyrenforth,
Attys.
THE NORRIS PETERS CO., PHOTO-LITHO., WASHINGTON, D. C.

(No Model.) 2 Sheets—Sheet 2.
J. KIESLER.
POWER SHOVEL.
No. 563,492. Patented July 7, 1896.
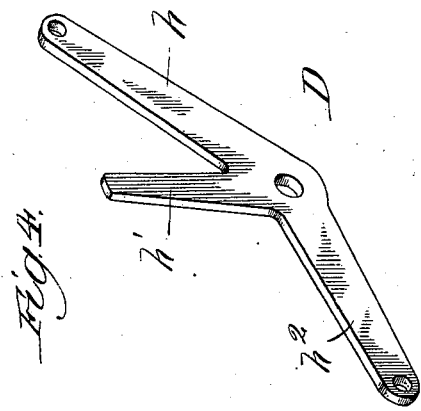
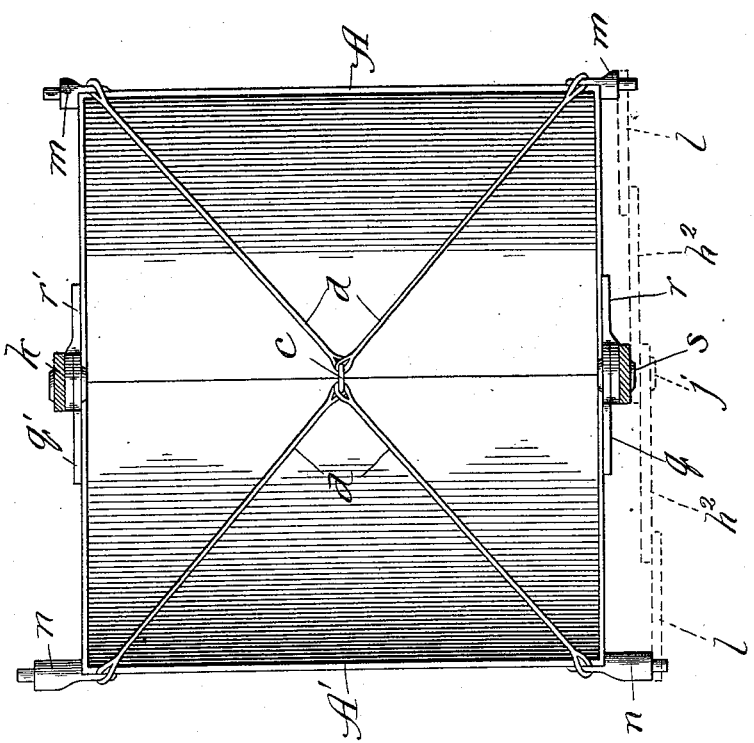
Witnesses:
Chas. E. Gaylord,
Luth J. Potter.
Inventor:
Joseph Kiesler,
By Dyrenforth & Dyrenforth,
Attys.
THE NORRIS PETERS CO., PHOTO-LITHO., WASHINGTON, D. C.

UNITED STATES PATENT OFFICE.

JOSEPH KIESLER, OF CHICAGO, ILLINOIS.

POWER-SHOVEL.

SPECIFICATION forming part of Letters Patent No. 563,492, dated July 7, 1896.

Application filed March 31, 1896. Serial No. 585,577. (No model.)

*To all whom it may concern:*

Be it known that I, JOSEPH KIESLER, a citizen of the United States, residing at Chicago, in the county of Cook and State of Illinois, have invented a new and useful Improvement in Power-Shovels, of which the following is a specification.

My invention relates to an improvement in power-shovels for use in unloading coal, grain, and the like material, as from the hull of a boat, and for analogous uses.

A power-shovel of the class to which my improvement relates involves, as its generally-stated construction, a pair of hinged scoop-shaped coöperating jaws provided with mechanism for closing them on the material to be transferred, thereby to fill the shovel with the latter, and for opening them to discharge the material at the point to which it is transferred.

My improvement relates particularly to the mechanism for operating the shovel-jaws, my object being to provide a novel and peculiarly effective mechanism for this purpose, whereby, moreover, the weight of the jaws need not be nearly so great as is common in this class of shovels to adapt them to perform their filling function.

Generally stated, the construction involves two scoops, in the form of hollow sectors of a cylinder, pivoted together along the axis of the cylinder, and having a peculiar arrangement of levers connected with a lifting-chain to force the scooping edges together for filling, and a chain available for relieving the levers of the weight of the filled shovel to dump it.

Referring to the accompanying drawings, Figure 1 is a view in end elevation of a shovel embodying my invention and showing the jaws closed; Fig. 2, a similar view of the shovel open and supported by the dumping-chain; Fig. 3, a plan section taken at the line 3 on Fig. 1 and viewed as indicated by the arrow, the links connecting with the dumping-chain being shown in full; and Fig. 4, a perspective view of one of the closing-levers employed.

A and A' are scoop-shaped jaws or shovel-sections, shown as hollow sectors of a cylinder having closed ends, of any desired shape which will not interfere with their rocking movement about an axis at which they are hinged together at their opposite ends, as shown at $s$.

The jaws may be made of sheet-iron of suitable thickness, in which case strengthening-strips $r$ $r'$ and $q$ $q'$, affording bearings for the hinge-pintles, should be provided.

At the outer upper corners of the respective jaws are ears $m$ and $n$, upon which are pivoted links $l$. Projecting upward from the hinges of the jaws, at their opposite outer ends, are arms $k$, carrying a shaft $j$, upon which are fulcrumed bell-crank levers D D, each having besides the lever-arms $h$ $h^2$ a branch arm $h'$. The arms $h^2$ are pivotally connected to the links $l$, while to the arms $h$ are pivoted links $g$, which, in turn, are joined by chains or by links $f$ to the ends of a lifting-beam E, with which are connected the lifting-cables $b$.

Fig. 3 shows a means of connecting a dumping-chain $e$ (shown in Fig. 1) with the jaws A A', through the medium of links $d$, diverging from a ring $c$ to the outer corner portions of the scoop-jaws.

The operation is as follows: The shovel supported by the dump-chain $e$ is lowered till it rests with the jaws open, as shown in Fig. 2, upon the material to be shoveled. The cable $e$ is then slacked, and simultaneously therewith the lifting-cables $b$ are drawn taut. It will be seen that the resultant effect is to cause the scoop-sections through their own weight to close and thereby dig into the material upon which they rest, since the lower arms $h$ of the bell-crank levers D D are drawn in an upward direction to rotate about the shaft $j$, thus forcing down the arms $h^2$, and so closing the jaws A A' through the medium of the links $l$. As more and more material is gathered by the scoop-jaws the strain on the lifting-cables $b$ increases and the closing force exerted on the bell-crank levers is increased proportionately till, finally, the jaws are forced together, as in Fig. 1, and the load is raised by suitable hoisting mechanism (not shown) with which the cables or chains $b$ are connected. After the load has been swung to the desired position for dumping, the dump-chain $e$ is made to support the weight of the load, as by stopping the hoisting-cables $b$ and drawing upon the dump-chain $e$, when the jaws immediately open under the pressure of the load of material in them supplemented by the draft strain on the links $d$.

As shown in Fig. 2, the function of the branch arms $h'$ on the bell-crank levers D D is to increase the purchase on the levers by bending outward the toggle-joint devices afforded by the links $g$ and $f$ at the instant of starting to close the jaws. This provision avoids pulling against what would, without it, practically be a dead-center, since a perpendicular line from the shaft $j$ to the line of application of the lifting force is greater than it would be without such provision.

While the particular details shown and described are believed best for the purpose for which I have devised my improved shovel, they may be variously modified without departure from my invention. Hence I do not wish to be understood as limiting my invention to such details except where the intention so to do is made manifest by the terms of the appended claims.

What I claim as new, and desire to secure by Letters Patent, is—

1. In a power-shovel, the combination of two hinged scoop-jaws, bell-crank levers fulcrumed upon a bearing supported by said jaws, and linked at one lever-arm to one of said jaws and connected at the other lever-arm with a hoisting-chain, or the like, and dumping mechanism operated independently of the hoist, substantially as described.

2. In a power-shovel, the combination of two hinged scoop-jaws, bell-crank levers fulcrumed upon bearings supported by said jaws and each linked at one lever-arm with one of said jaws, and having a jointed-link connection at its other lever-arm with a hoisting-chain, or the like, each said lever having a branch arm to engage said jointed-link connection, and dumping mechanism, substantially as described.

3. In a power-shovel, the combination of two hinged scoop-jaws, bell-crank levers fulcrumed upon a bearing supported by said jaws and each linked at one lever-arm to one of said jaws and connected at its other lever-arm with a hoisting-chain, or the like, and dumping mechanism comprising links converging from the outer corner portions of the jaws and fastened to a common dumping-chain, or the like, substantially as described.

4. A power-shovel comprising, in combination, the hinged scoop-jaws A and A' having bearings $k$, carrying a shaft $j$, the bell-crank levers D, having the branch arms $h'$, links $l$ connecting said levers to the scoop-sections, links $g$ and $f$ and a beam E for connecting said bell-cranks with a lifting-cable, and links $d$ on said jaws for connecting them with a dump-cable, the whole being constructed and arranged to operate substantially as described.

JOSEPH KIESLER.

In presence of—
J. H. LEE,
WM. H. TAYLOR.